United States Patent [19]

Bolz et al.

[11] Patent Number: 4,636,005
[45] Date of Patent: Jan. 13, 1987

[54] SEAT BACK FOR A MOTOR VEHICLE REAR SEAT ASSEMBLY

[75] Inventors: Richard Bolz, Flörsheim; Walter P. Trutter, Wiesbaden, both of Fed. Rep. of Germany

[73] Assignee: General Motors Corporation, Detroit, Mich.

[21] Appl. No.: 775,513

[22] Filed: Sep. 12, 1985

[30] Foreign Application Priority Data

Sep. 15, 1984 [DE] Fed. Rep. of Germany ....... 3433996

[51] Int. Cl.$^4$ .............................................. B60N 1/02
[52] U.S. Cl. .................. 297/379; 296/65 R; 297/DIG. 2
[58] Field of Search ................. 297/378, 379, DIG. 2; 296/65 R, 63, 67, 69, 354, 353

[56] References Cited

U.S. PATENT DOCUMENTS

| 2,805,181 | 9/1953 | Groff et al. | 297/DIG. 2 |
| 3,713,938 | 1/1973 | Sutton | 297/DIG. 2 |
| 4,045,079 | 8/1977 | Arlauskas et al. | 297/379 X |
| 4,142,757 | 3/1979 | Fogle, Jr. et al. | 297/DIG. 2 |
| 4,169,626 | 10/1979 | Hollar, Jr. | 297/379 X |
| 4,333,683 | 6/1982 | Ambosz | 297/DIG. 2 |
| 4,475,763 | 10/1984 | Hamatani et al. | 297/378 X |

FOREIGN PATENT DOCUMENTS 57-4427  1/1982  Japan ........................... 297/DIG. 2

Primary Examiner—William E. Lyddane
Assistant Examiner—Mark W. Binder
Attorney, Agent, or Firm—William A. Schuetz

[57] ABSTRACT

The seat back for a motor vehicle rear seat assembly has a rear panel made of plastics. A locking mechanism housing, which is part of a seat back locking arrangement, and the rear panel are forming a one-piece structure. To provide the necessary rigidity, fiber glass mats are laminated into the plastics. The plastic material itself is polypropylene.

2 Claims, 3 Drawing Figures

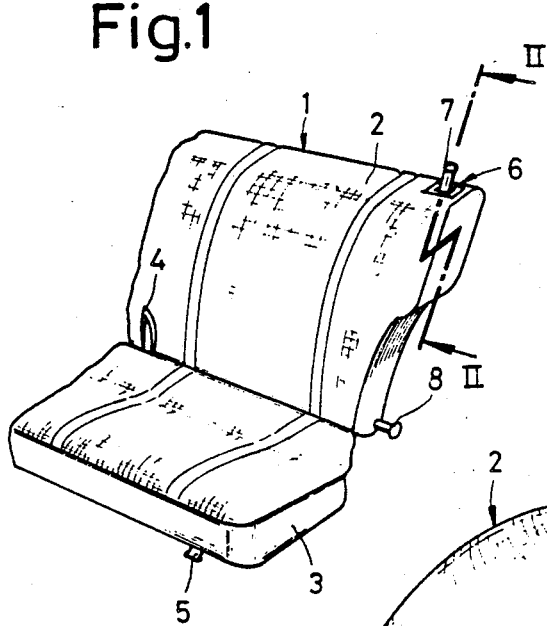
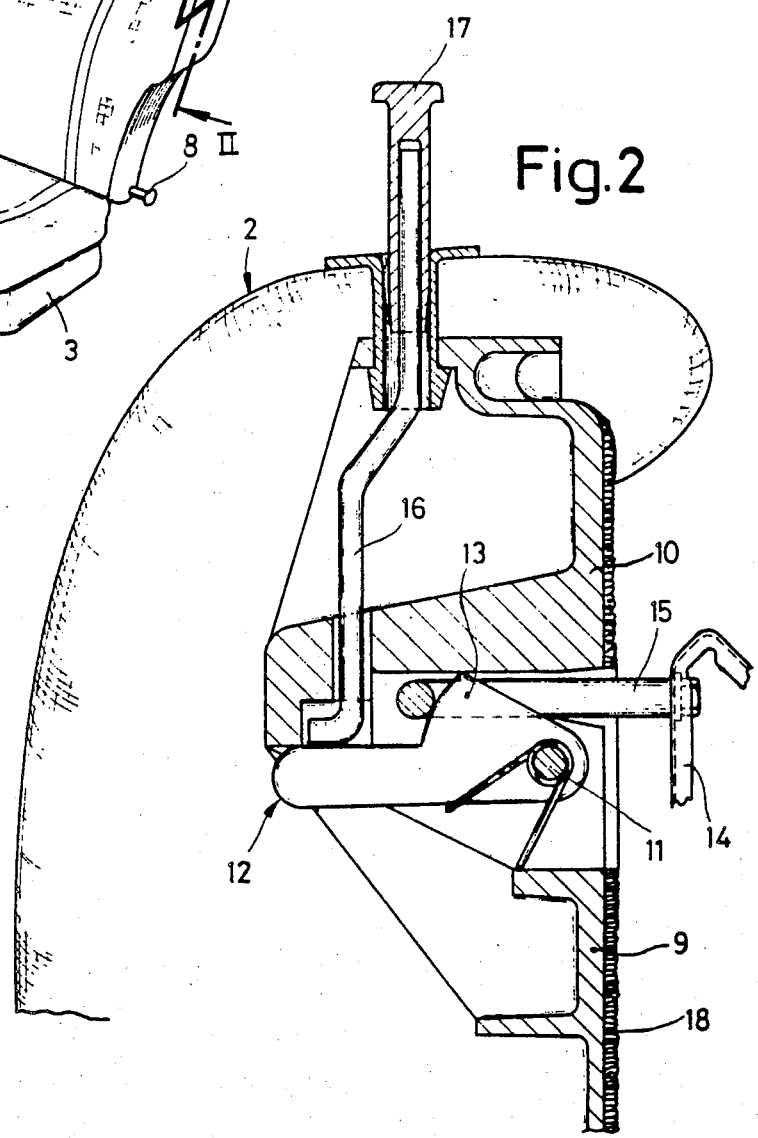
Fig.1
Fig.2

SEAT BACK FOR A MOTOR VEHICLE REAR SEAT ASSEMBLY

The invention relates to a seat back for a motor vehicle rear seat assembly, including a seat back rear panel made of plastics which is adapted to accommodate the housing of a seat back locking mechanism. Rear seat seat backs of this type are currently used in motor vehicles that have fold-away rear seat assemblies and are generally known in the art.

In one vehicle that is being marketed, the housing of the seat back locking mechanism is a separate component which is fitted to the inside of the seat back rear panel and fastened thereto. In order to render the rear panel sufficiently rigid, a sheet metal plate is laminated into the plastic member.

This prior art seat back arrangement is relatively complex and costly and involves a significant assembly expense factor, because the housing of the seat back locking mechanism must be fastened to the seat back rear panel by threaded bolts or rivets. Furthermore, there is the possibility that the housing is not properly installed and, therefore, not adequately retained on the rear panel of the seat back, which could result in rattling noises.

It is the object of the present invention to incorporate features into the seat back of a motor vehicle rear seat of the type identified above that enable the housing of the seat back locking mechanism to be arranged on the seat back in a very costeffective manner.

In accordance with the invention, this object is attained in that the locking mechanism housing and the seat back rear panel are of a one-piece construction.

There are several advantages that accrue from the novel seat back arrangement in comparison to prior art arrangements, foremost of them being the advantage that by integrating the locking mechanism housing into the seat back rear panel, the labor-intensive procedure of installing the housing into the seat back can be dispensed with. There is also a cost saving advantage in that the sheet metal inserts, which formerly had to be laminated into the plastic material in the vicinity of the locking mechanism, can be eliminated. Besides the cost reduction, the elimination of the sheet metal inserts and the fastening elements for the locking mechanism housing also results in weight savings with the attendant benefit of lower fuel consumption. The invention is applicable to split as well as one-piece rear seat seat backs.

The rear panels of the seat backs can be provided with the necessary rigidity in the vicinity of the locking mechanism housing if the rear panel is made of a glass fiber reinforced plastic material.

Simplicity of manufacture is attained in accordance with the invention in that the glass fibers are laminated into the plastic material in the form of glass fiber mats.

One type of plastics that has proved to be very suitable for the subject seat back is polypropylene, because this material enables the rear panels to be manufactured by the flow molding technique. The principal advantages deriving from the use of glass fiber mat polypropylene laminate, as compared to drawn sheet metal parts, are its lower weight and higher corrosion resistance. Another consideration for selecting plastics over metal is its superior formability that allows a wider range of shapes. As compared to injection molded parts, the material used according to the invention is characterized by its superior mechanical stability which is uniformly distributed in all directions, its improved thermal properties over a wide range of temperatures, and its higher impact strength. Glass mat polypropylene also possesses significant advantages when compared to UP resin mats, one of them being that the likelihood of surface imperfections is greatly reduced. Furthermore, the material proposed by the present invention is solvent-free, so that there is no bubble formation during painting.

As mentioned earlier, the rear panel for the seat back is made, preferably, by the flow molding technique.

Since the rearwardly facing surface of the rear seat seat back is forming part of the vehicle floor in the folded-down position, it is usually lined with a carpet. This can be accomplished in a relatively simple manner in that a carpet is formed or molded onto the outer surface of the rear panel.

It should be appreciated that a variety of arrangements may be utilized in the practice of the invention. To convey the concept of the invention, one exemplary embodiment is illustrated in the accompanying drawing and described in the following specifications.

FIG. 1 is a three-dimensional view of a side portion of a motor vehicle rear seat in accordance with the invention;

FIG. 2 is a sectional view at an enlarged scale taken along 2—2 of FIG. 1; and

Figure 3:
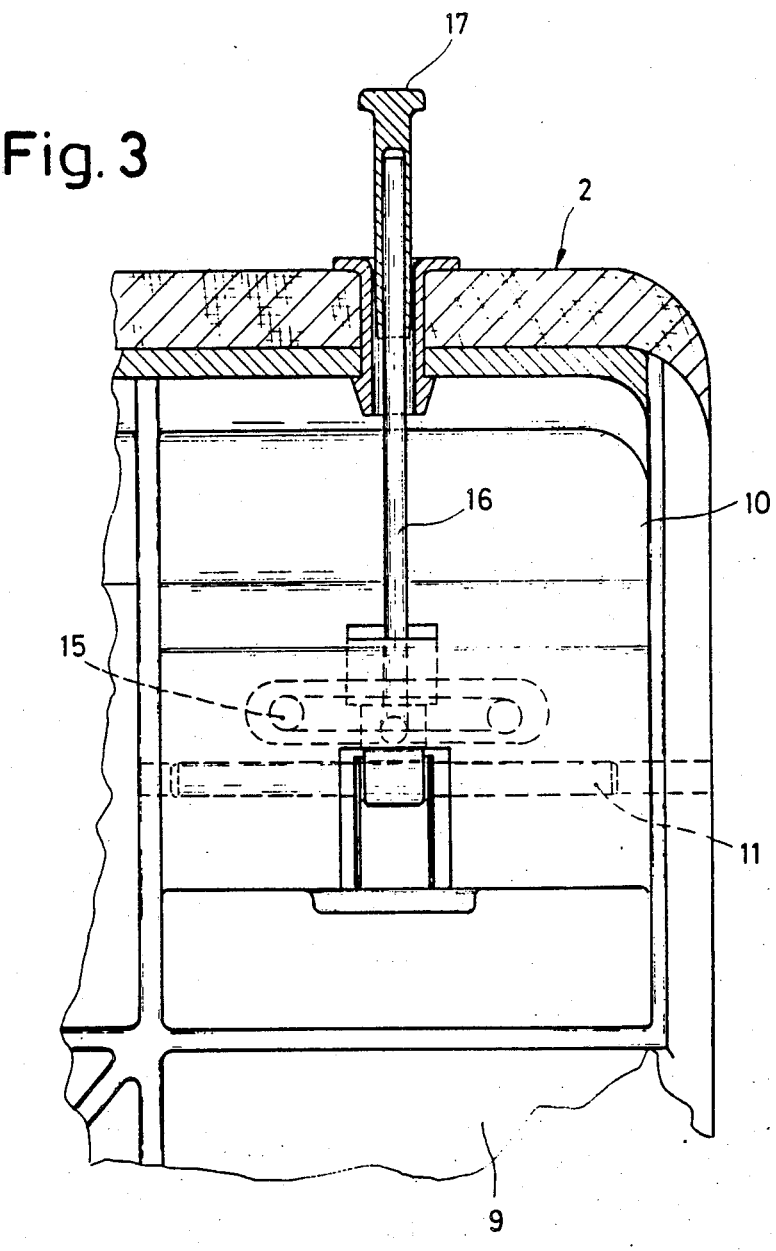
FIG. 3 is a section, as viewed from the front, of a portion of the rear seat seat back according to the invention.

FIG. 1 illustrates the lateral portion of a rear seat assembly 1, which is comprised of a seat back 2 and a seat cushion 3. The seat cushion 3 can be lifted up at its rearward end by means of a loop-type handle 4 and be pivoted so as to assume an upright position. For this purpose, hinges 5 are provided on the front end of the seat cushion.

A rear seat seat back locking device 6, which can be unlocked by means of an actuating device 7, arranged in the seat back 2, is illustrated in dotted lines in FIG. 1. The unlocked rear seat seat back 2 can be knocked down forwardly through swinging movement about an axis 8.

FIG. 2 shows in greater detail the basic components employed in the rear seat seat back according to the invention. One will notice again the seat back 2 which includes a rear panel 9 made of polypropylene into which glass fiber mats are laminated, and which is made by the flow molding technique. This technique enables a locking mechanism housing 10 to be formed or integral with the rear panel 9 in one single operation.

As clearly shown in FIG. 2, the rear panel has a planar back portion or side and the integral housing 10 extends interiorly of the rear seat back 2. The housing 10 includes an upper or first inwardly projecting portion 10a, an intermediate or second inwardly projecting portion 10b and a lower or third inwardly projecting portion 10c. The upper and intermediate projecting portions have vertically extending through apertures 10d and 10e, respectively, for slidably receiving a locking and unlocking rod 16. A transverse opening 10f in communication with the aperture 10e extends through the back side and housing 10 of the rear panel 9. A pivotal latch bar 12 is disposed within the opening 10f and the later also receives a tongue-like locking member 15 fixed to a body component or structure 14.

As apparent from the drawings especially FIG. 3, the latch bar 12 is fixed to a shaft 11 pivotally supported by the housing 10 at its sides 10g adjacent the opening 10f. As best seen in FIG. 2, the latch bar 12 is biased by a spring means 10h toward an upper position in which a locking projection 13 thereon is received within or engages the tongue like locking member 15 to lock the seat back 2 in its upright position and in which the latch bar engages the rod 16.

To unlock the seat back locking mechanism 6, an unlocking rod 16 is provided which projects out of the top of the seat back and which is adapted to be displaced downwardly by means of an actuating button 17 (FIG. 2) which is fitted thereto. This downward movement of the unlocking rod 16 will move the latch bar 12 into counterclockwise direction in opposition to the biasing force of the spring means 10h; and thereby cause the seat back 2 to be unlocked to enable it to be folded forwardly and become a portion of the vehicle floor.

It should be appreciated that the seat back locking mechanism 6 for the rear seat 1 may also be of a type which operates on the basis of a different locking principle. The characteristic feature of the invention is that the lock mechanism housing 10 and the rear panel 9 are combined to form a one-piece unit.

When the rear seat seat back 2 is folded down, the rear panel 9 becomes a portion of the vehicle floor. Inasmuch as the rear panel 9 is made of a plastic material, a carpet 18 may be formed into the plastics.

The embodiments of the invention in which an exclusive property or privilege is claimed are defined as follows:

1. A rear seat assembly for an automotive vehicle having body structure and comprising a rear seat cushion, a foldable rear seat back supported for movement between an upright position in which it is latched to an adjacently located locking member carried by the vehicle body structure and a folded position in which its rear panel forms part of the vehicle floor, and a releasable locking mechanism carried by said rear panel of said seat for latching and unlatching said rear seat back to said locking member, the improvement being that said rear seat panel is made from a fiber reinforced plastic material and includes a rear panel portion and a housing formed integral therewith which extends interiorly of the rear seat, said housing including first and second vertically spaced inwardly extending portions each having a generally vertically extending opening for slidably receiving a locking rod and said rear seat panel having a transverse opening adjacent said second inwardly extending portion for receiving said locking member carried by said vehicle body structure, and wherein said housing at its sides pivotally supports a latch bar disposed within said transverse opening which is spring biased into engagement with said locking and unlocking rod and toward a locking position in which a locking projection thereof locks said rear seat back to the latching member on said vehicle body structure when the rear seat back is in its upright position, said latch bar being pivotally movable to a position in which it is unlatched from said latching member in response to movement of said locking and unlocking rod.

2. A rear assembly, as defined in claim 1, and wherein said rear panel portion on its back side has carpet formed thereon.

* * * * *